G. L. MOORE.
SIGHT FEED LUBRICATOR FOR AUTOMOBILES.
APPLICATION FILED AUG. 1, 1919.
1,331,996. Patented Feb. 24, 1920.
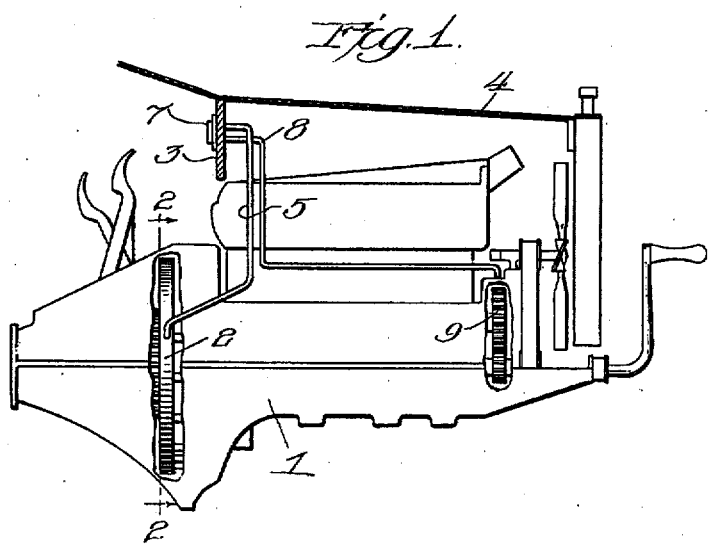
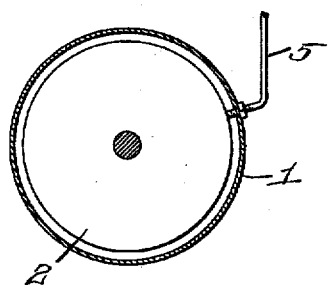
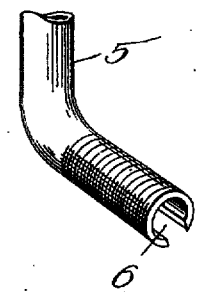
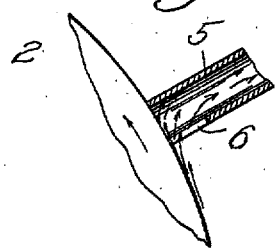

UNITED STATES PATENT OFFICE.

GEORGE L. MOORE, OF CHICAGO, ILLINOIS, ASSIGNOR OF ONE-HALF TO WINTHROP BURDICK, OF CHICAGO, ILLINOIS.

SIGHT-FEED LUBRICATOR FOR AUTOMOBILES.

1,331,996.

Specification of Letters Patent. Patented Feb. 24, 1920.

Application filed August 1, 1919. Serial No. 314,636.

*To all whom it may concern:*

Be it known that I, GEORGE L. MOORE, a citizen of the United States, residing at Chicago, in the county of Cook and State of Illinois, have invented a certain new and useful Improvement in Sight-Feed Lubricators for Automobiles, and declare the following to be a full, clear, and exact description of the same, such as will enable others skilled in the art to which it pertains to make and use the same, reference being had to the accompanying drawings, which form a part of this specification.

In the Ford automobiles there is no provision made for clearly indicating to the driver the condition of the oil in the crank case. The object of the present invention is to produce a simple and novel attachment by means of which an indication will be made at the dashboard, or at some other convenient point, of the presence of an amount of oil above the danger point in the crank case of the engine of a Ford automobile or a similar engine. A further object of the present invention is to produce an automatic feed of the oil from the bottom of the crank case of a Ford engine or the like to parts to be lubricated, at the same time make the flow of the oil visible to the driver.

The various features of novelty whereby my invention is characterized will hereinafter be pointed out particularly in the claim; but for a full understanding of my invention, and of its objects and advantages, reference may be had to the following detailed description taken in connection with the accompanying drawing.

Figure 1 is a central longitudinal vertical section through the hood and dash of a Ford automobile, the engine being shown in elevation;

Fig. 2 is a section taken approximately on line 2—2 of Fig. 1, and

Fig. 3 is a perspective view on a large scale of the receiving end of the oil conduit.

Fig. 4 is an enlarged detailed view.

Referring to the drawing, number 1 represents the crank case of an automobile engine, in the present instance a Ford engine, and 2 is the fly-wheel of the engine. The automobile dash is indicated at 3. All of these parts may take any usual or preferred forms, although, as heretofore stated, the invention is particularly applicable to Ford automobiles.

In accordance with my invention, I place beside the engine, preferably under the hood 4, an oil conduit 5. The lower end of the conduit may conveniently be screwed through the wall of the crank casing, as best shown in Fig. 2, preferably in the plane of the fly-wheel so that the free end of the conduit may be brought close to the fly-wheel. The part of the conduit within the crank case, in the vicinity of the wheel, is preferably approximately radial to the fly-wheel and, as best indicated in Fig. 3, is provided on the under side with a slot 6. The conduit is placed on the side of the fly-wheel which carries oil upwardly from the bottom of the crank case, and is preferably so positioned that the oil which is carried upwardly as far as the conduit enters the slot 6 in the conduit under considerable pressure or momentum and may therefore be caused to travel a considerable distance through the conduit.

The oil conduit is carried up behind the dash and communicates with the upper end of a transparent tube or box 7, placed on the front side of the dash. A discharge conduit 8 leads from the lower end of the member 7 back to the engine. The conduit 8 may discharge into the crank case at any suitable point, but is preferably carried to the front end of the engine so as to discharge upon the gears 9 found at that point; thus automatically lubricating these gears in a positive manner as long as there is sufficient oil in the crank case to enable the fly-wheel to carry some of it upwardly and force it through the conduits.

As long as there is sufficient oil in the crank case to insure proper lubrication, the fly-wheel will be able to feed the oil through the conduits 5 and 8, such flow being visible to the driver by reason of the indicator 7. As soon as the oil drops below the danger point, the feed of the oil ceases, and the driver is instantly apprised of the fact.

While I have illustrated and described with particularity only a single preferred form of my invention, I do not desire to be limited to the exact structural details thus illustrated and described; but intend to cover all forms and arrangements which fall within the terms of the definitions of my invention constituting the appended claim.

I claim:

The combination with an engine having a fly-wheel operating in a crank case, of an oil pipe having an open end and a slot or notch cut into the edge of the pipe at said end on one side thereof, and means for supporting said pipe so as to hold it approximately radial of the fly-wheel with said open end facing and in close proximity to the periphery of the latter and with said notch or slot facing in the direction to meet the oil adhering to the peripheral surface of the fly-wheel as the said surface carries oil upwardly from the bottom of the crank case, said conduit including a transparent portion to serve as an indicator and a return portion to carry the oil back to the engine.

GEORGE L. MOORE.